(12) United States Patent
Hirota

(10) Patent No.: US 11,485,417 B2
(45) Date of Patent: Nov. 1, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventor: Takuya Hirota, Toyota (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 113 days.

(21) Appl. No.: 17/017,678

(22) Filed: Sep. 11, 2020

(65) Prior Publication Data
US 2021/0078638 A1  Mar. 18, 2021

(30) Foreign Application Priority Data
Sep. 12, 2019  (JP) .............................. JP2019-166582

(51) Int. Cl.
*B62D 21/15* (2006.01)
*B62D 25/20* (2006.01)

(52) U.S. Cl.
CPC ....... *B62D 21/157* (2013.01); *B62D 25/2036* (2013.01)

(58) Field of Classification Search
CPC ......................... B62D 21/157; B62D 25/2036; B62D 25/025; B62D 25/20; B60K 2001/0438; B60K 1/04; B60Y 2306/01
USPC .. 296/204, 187.12, 209, 193.07, 203.03, 30, 296/29, 205
See application file for complete search history.

(56) References Cited

U.S. PATENT DOCUMENTS

| 2011/0174556 | A1* | 7/2011 | Hermann | B60L 50/64 429/62 |
| 2017/0305248 | A1* | 10/2017 | Hara | B60L 50/66 |
| 2018/0126933 | A1 | 5/2018 | Kawase et al. | |
| 2018/0215245 | A1* | 8/2018 | Sudhindra | B60L 50/64 |
| 2018/0312199 | A1* | 11/2018 | Kawase | B62D 21/157 |
| 2018/0370570 | A1* | 12/2018 | Ayukawa | B62D 25/2018 |
| 2018/0370577 | A1* | 12/2018 | Takahashi | B60K 1/04 |

(Continued)

FOREIGN PATENT DOCUMENTS

| JP | 2013256265 A | 12/2013 |
| JP | 201875939 A | 5/2018 |
| JP | 20196303 A | 1/2019 |

*Primary Examiner* — D Glenn Dayoan
*Assistant Examiner* — E Turner Hicks
(74) *Attorney, Agent, or Firm* — Hauptman Ham, LLP

(57) ABSTRACT

A vehicle body lower structure may comprise: a rocker arranged at a lower lateral part of a vehicle body; a power supply package arranged under a floor panel of the vehicle; a first energy absorbing member fixed to a lateral side of the power supply package; and a second energy absorbing member being adjacent to the first energy absorbing member in a vehicle-width direction of the vehicle body, the second energy absorbing member being located outside the first energy absorbing member in the vehicle-width direction of the vehicle body. The first energy absorbing member may include a first protrusion protruding outward in the vehicle-width direction, the second energy absorbing member may include a second protrusion protruding inward in the vehicle-width direction, and the first protrusion and the second protrusion may overlap each other as seen along an up-down direction and are fixed together to the rocker by a bolt.

5 Claims, 5 Drawing Sheets

(56) References Cited

U.S. PATENT DOCUMENTS

| | | | |
|---|---|---|---|
| 2019/0009662 A1* | 1/2019 | Toyota | B60K 1/04 |
| 2019/0031241 A1* | 1/2019 | Ayukawa | B60L 50/66 |
| 2019/0382051 A1* | 12/2019 | Toyota | B62D 25/02 |

* cited by examiner

VEHICLE BODY LOWER STRUCTURE

CROSS-REFERENCE TO RELATED APPLICATION

This application claims priority to Japanese Patent Application No. 2019-166582 filed on Sep. 12, 2019, the contents of which are hereby incorporated by reference into the present application.

TECHNICAL FIELD

The art disclosed herein relates to a vehicle body lower structure. The art relates in particular to a lower structure of a vehicle body in which a power supply package is arranged under a floor panel.

BACKGROUND

In some electric vehicles, a power supply package configured to supply power to a traction motor is arranged under a floor panel. The power supply package is arranged between a pair of rockers. Japanese Patent Application Publication Nos. 2018-75939 (Literature 1), 2019-6303 (Literature 2), and 2013-256265 (Literature 3) describe examples of such an electric vehicle. The pair of rockers is a frame extending along a front-rear direction of a vehicle body at lateral sides of a lower part of each vehicle body. The rockers may be sometimes referred to as "side sills". The power supply package may include a battery, a fuel cell, and the like.

In order to protect the power supply package from an impact of lateral collision from a lateral side of a vehicle body, there may be a case where a member configured to absorb impact energy (energy absorbing member) by the shock is arranged along each of the rockers. Literatures 1 and 3 describe examples of such an energy absorbing member.

Further, Literature 2 describes art of providing a structure configured to absorb energy inside the rocker.

SUMMARY

In the structure of fixing the power supply package to the rocker via the energy absorbing member, a high rigidity along an up-down direction is required in the energy absorbing member to suppress the power supply package from sagging. Meanwhile, if a power supply package of a same size can be mounted in various types of vehicles with different vehicle widths, component commonization can be achieved. In that case, there is a need to prepare plural types of energy absorbing members that have high rigidity in the up-down direction and configured to absorb energy upon collision with regard to a lateral direction (vehicle-width direction). The present disclosure provides an art configured to suppress cost for preparing plural types of energy absorbing members for various types of vehicles with different vehicle widths.

A vehicle body lower structure may comprise: a rocker arranged at a lower lateral part of a vehicle body and extending along a front-rear direction of the vehicle body; a power supply package arranged under a floor panel of the vehicle body; a first energy absorbing member fixed to a lateral side of the power supply package; and a second energy absorbing member being adjacent to the first energy absorbing member in a vehicle-width direction of the vehicle body, the second energy absorbing member being located outside the first energy absorbing member in the vehicle-width direction of the vehicle body. The first energy absorbing member may include a first protrusion protruding outward in the vehicle-width direction, the second energy absorbing member may include a second protrusion protruding inward in the vehicle-width direction, and the first protrusion and the second protrusion may overlap each other as seen along an up-down direction and are fixed together to the rocker by a bolt.

In the vehicle body lower structure disclosed herein, the power supply package and the rocker are connected by two energy absorbing members. One of the energy absorbing members (the first energy absorbing member) is fixed to the power supply package. Due to this, by simply modifying (replacing) the second energy absorbing member, the vehicle body lower structure becomes compatible with various types of vehicles with different vehicle widths. By configuring a part of the energy absorbing members (the first energy absorbing member) between the power supply package and the rocker as a component accompanying the power supply package and configuring the remaining part (the second energy absorbing member) replaceable, cost for achieving compatibility to various types of vehicles with different vehicle widths can be suppressed.

The first protrusion may be arranged under the second protrusion. The first energy absorbing member can be attached to the vehicle body together with the power supply package after the second energy absorbing member has been attached to the vehicle body.

The second energy absorbing member may be fixed to the rocker by an additional bolt located outside the bolt in the vehicle-width direction. The second energy absorbing member is rigidly fixed to the rocker. Rigidity of the first/second energy absorbing members as a whole in the up-down direction is enhanced, thereby the power supply package may be effectively suppressed from sagging by gravity.

With the enhanced rigidity of the first/second energy absorbing members as a whole in the up-down direction, the energy absorbing members may not be displaced in the up-down direction but may be rather collapsed in a horizontal direction upon when a lateral collision occurs to the vehicle, thus the power supply package can be effectively protected.

The first and second energy absorbing members may typically be hollow beams extending along the front-rear direction of the vehicle body. The first protrusion may protrude from a lower plate of the first energy absorbing member, and the second protrusion may protrude from an upper plate of the second energy absorbing member.

Details and further developments of the art disclosed herein will be described in DETAILED DESCRIPTION as below.

DETAILED DESCRIPTION

Embodiment

Figure 1:
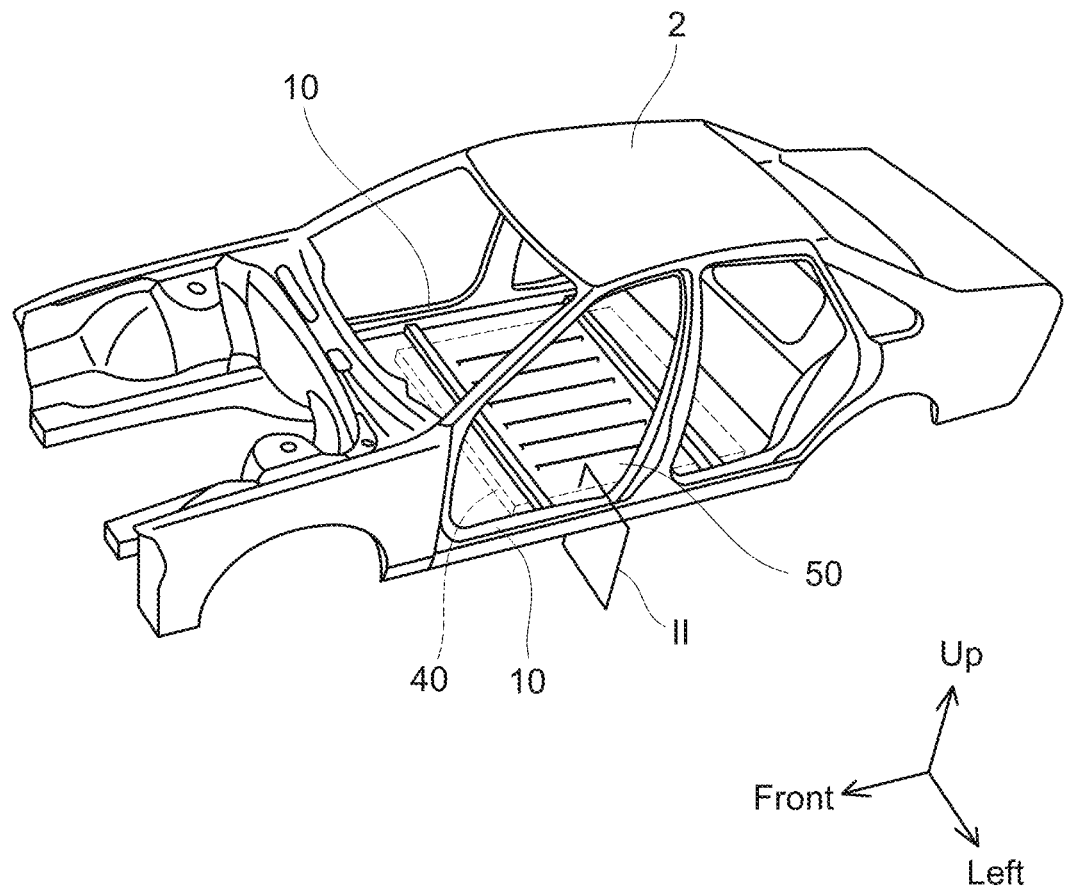
FIG. 1 is a perspective view of a vehicle body.

A vehicle body lower structure 3 according to an embodiment will be described with reference to the drawings. FIG. 1 illustrates a perspective view of a vehicle body 2. "Left" in a coordinate system of FIG. 1 indicates "left" in a case of seeing a front side from a rear side of the vehicle body. The "Left" in the coordinate system has a like meaning in all of the drawings.

The vehicle body 2 comprises a pair of rockers 10. Each of the rockers 10 is arranged at a corresponding lateral side of a lower part of the vehicle body 2 in a vehicle-width (left-right) direction of the vehicle body 2. Each rocker 10 is hollow, has an elongated shape, and extends along a front-rear direction of the vehicle body. The pair of rockers 10 is one type of frames configured to secure rigidity of the vehicle body. The rockers 10 are made by extrusion molding of a metal (typically, aluminum).

A power supply package 40 and a floor panel 50 are arranged between the pair of rockers 10. The power supply package 40 incorporates a large number of battery cells therein. The battery cells are connected in series, and configured to output high-voltage power. The power supply package 40 is configured to supply the power to a traction motor (not shown). The power supply package 40 may be a collective body of fuel cells.

The floor panel 50 corresponds to a floor of a cabin. Each side of the floor panel 50 is fixed to corresponding one of the rockers 10. The power supply package 40 is arranged under the floor panel 50. Although details will be described later, an energy absorbing member (not shown in FIG. 1) is arranged along the rockers 10, and the power supply package 40 is supported by the pair of rockers 10 via the energy absorbing member. Hereafter, the energy absorbing member will be referred to as an EA member (Energy Absorbing member) for convenience of description.

Figure 2:
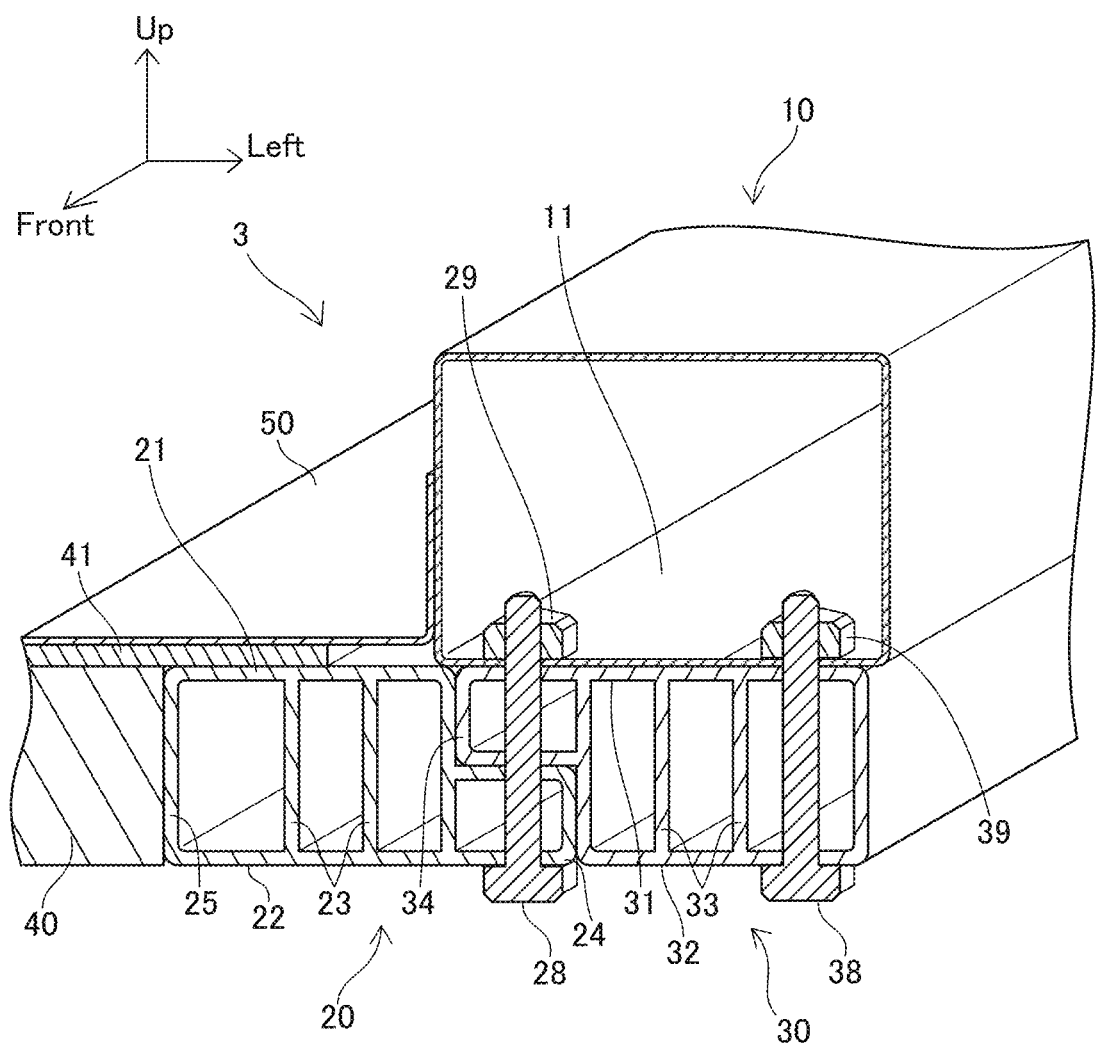
FIG. 2 is a cross-sectional view of the vehicle body taken along a plane II of FIG. 1.

FIG. 2 shows a cross section of the vehicle body 2 cut along a plane II of FIG. 1. FIG. 2 shows the lower structure 3 on a left side of the vehicle body 2. The vehicle body 2 is symmetrical in the left-right direction, and the lower structure 3 on a right side of the vehicle body 2 has a same structure as that of FIG. 2. Accordingly, a description of the lower structure of the right side of the vehicle body 2 will be omitted.

Although the rocker 10 is a frame constituted of joined two parts (a rocker inner panel and a rocker outer panel), FIG. 2 illustrates the rocker 10 as a one tubular member for simplification.

As aforementioned, the floor panel 50 and the power supply package 40 are arranged between the pair of rockers 10. A left side of FIG. 2 corresponds to an inner side of the vehicle body in the vehicle-width direction. A right side of FIG. 2 corresponds to an outer side of the vehicle body in the vehicle-width direction.

A first EA member 20 (first energy absorbing member 20) is joined to a lateral side of the power supply package 40. A side surface of the power supply package 40 is fixed to an inner plate 25 of the first EA member 20 with adhesive. Further, a support plate 41 is coupled to an upper surface of the power supply package 40, and the support plate 41 extends above the first EA member 20. The power supply package 40 has its side surface fixed to the first EA member 20, and is fixed to the first EA member 20 via the support plate 41.

The floor panel 50 is located above the power supply package 40. The floor panel 50 is fixed to a side surface of the rocker 10 on an inner side in the vehicle width direction. The floor panel 50 also covers the first EA member 20.

A second EA member 30 (second energy absorbing member 30) is arranged on an outer side of the first EA member 20 in the vehicle width direction. The first EA member 20 comprises a first protrusion 24 protruding outward in the vehicle-width direction, and the second EA member 30 comprises a second protrusion 34 protruding inward in the vehicle-width direction. In other words, the first EA member 20 comprises the first protrusion 24 protruding toward the second EA member 30, and the second EA member 30 comprises the second protrusion 34 protruding toward the first EA member 20.

The first protrusion 24 and the second protrusion 34 are fastened together to a bottom plate of the rocker 10 by a bolt 28. Further, the second EA member 30 is fixed to the rocker 10 by another bolt 38 (an additional bolt). Nuts 29 and 39 are joined to an inner side of the bottom plate 11 of the rocker 10, and the bolt 28 is fixed to the nut 29 and the bolt 38 is fixed to the nut 39. The bolt 38 is on the outer side of the vehicle body in the vehicle-width direction relative to the bolt 28.

The first EA member 20 and the second EA member 30 are each a hollow beam extending along the side surface of the power supply package 40. The first EA member 20 and the second EA member 30 are configured to absorb collision energy exerted upon the lateral collision, and protect the power supply package 40. The first EA member 20 and the second EA member 30 are configured to absorb the collision energy by collapsing in the vehicle-width direction by an impact of the collision. The rocker 10 also contributes to absorption of the collision energy, however, the rocker 10 alone is insufficient to absorb the collision energy all on its own. To address this, the hollow first EA member 20 and the hollow second EA member 30 are arranged on the lateral side of the power supply package 40.

Strengths of the first EA member 20 and the second EA member 30 are determined in advance by a simulation, for example, such that the members can effectively absorb the collision energy. The strengths of the first EA member 20 and the second EA member 30 are set lower than at least a strength of the power supply package 40.

The first EA member 20 and the second EA member 30 will be described in detail. As aforementioned, each of the first EA member 20 and the second EA member 30 is a hollow beam, and has a cornered tubular shape. As such, a cross section of each of the first EA member 20 and the second EA member 30 perpendicular to the front-rear direction has a same shape at any position along the front-rear direction. The first EA member 20 and the second EA member 30 are made by an extrusion molding method of a metal (typically aluminum).

Two vertical ribs 23 connecting the upper plate 21 and the lower plate 22 are arranged within the first EA member 20. The vertical ribs 23 enhance strength of the first EA member 20 in the up-down direction. Two vertical ribs 33 connecting the upper plate 31 and the lower plate 32 are arranged within the second EA member 30. The vertical ribs 33 enhance strength of the second EA member 30 in the up-down direction as well as strength of the vehicle body in the front-rear direction. Meanwhile, the vertical ribs 23 hardly contributes to the strength of the first EA member 20 in the vehicle-width direction. The vertical ribs 23 enhance the strength of the first EA member 20 in the up-down direction and the rigidity of the vehicle body in the front-rear direction, however, the ribs 23 do not reduce (impede) the function of absorbing the collision energy of the lateral collision. The vertical ribs 33 of the second EA member 30 also achieve a similar advantage.

Although FIG. 2 shows the lower structure of the vehicle body on the left side, the lower structure of the vehicle body on the right side is also similar. Further, the rocker 10, the first EA member 20, and the second EA member 30 have an elongated shape in the front-rear direction. Although FIG. 2 only shows one bolt 28 (and one bolt 38), the first EA member 20 and the second EA member 30 are fixed to the rocker 10 by plural bolts 28 (as well as plural bolts 38) aligned along the front-rear direction.

Figure 3:
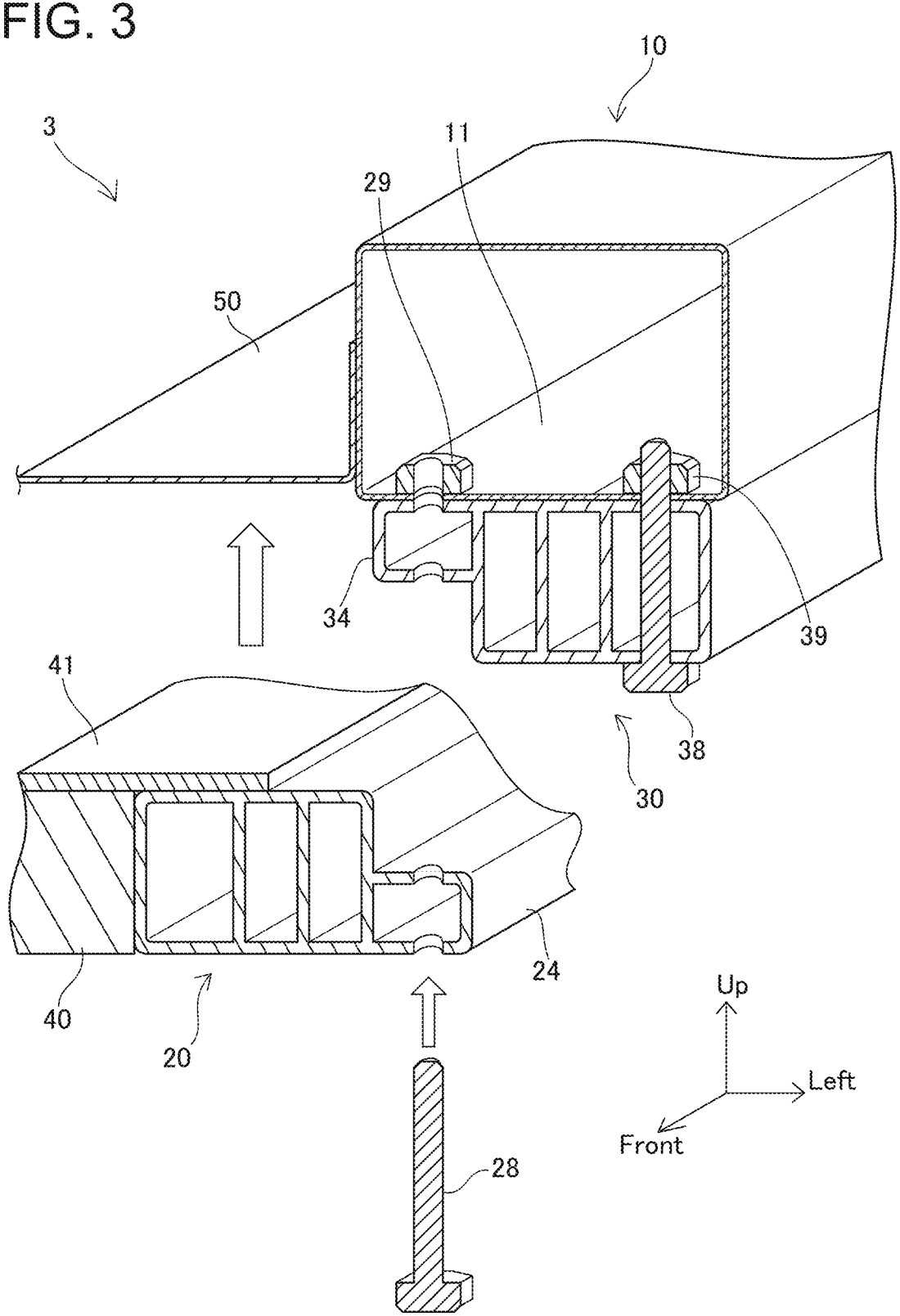
FIG. 3 illustrates a power supply package and a first energy absorbing member being separated from a second energy absorbing member and a rocker.

FIG. 3 illustrates the power supply package 40 and the first EA member 20 being separated from the second EA member 30 and the rocker 10. The first FA member 20 is fixed to the side surface of the power supply package 40 with the adhesive. As shown in FIG. 3, after the second EA member 30 is fixed to the rocker 10 (vehicle body), the power supply package 40 can be fixed to the rocker 10 (vehicle body) together with the first EA member 20.

Some advantages of the vehicle body lower structure 3 in which two EA members (the first EA member 20 and the second EA member 30) are aligned in the vehicle-width direction on each lateral side of the power supply package 40 will be described. A distance between the pair of rockers 10 varies depending on types of vehicle bodies. In the vehicle body lower structure 3 according to the embodiment, the power supply package 40 and each of the rockers 10 are fixed to each other with the two EA members (the first EA member 20 and the second EA member 30). The first EA member 20 is used for all types of vehicles, and the second EA member 30 of an appropriate width is selected from among plural types of the second EA members 30 depending on the type of the vehicle. Since the first EA member 20 can be used for any types of vehicles, cost for preparing plural types of EA members for vehicle types with different vehicle widths can be suppressed.

The second EA member 30 is further fixed to the rocker 10 by the other bolt 38 on the outer side in the vehicle-width direction relative to the bolt 28 fastening the first EA member 20 together with the second EA member 30. The second EA member 30 is firmly fixed to the rocker 10. Rigidity of the EA members as a while (first EA member 20 and the second EA member 30) in the up-down direction is enhanced, and the power supply package 40 is effectively suppressed from sagging by gravity.

Further, if deflection of the EA members in the up-down direction is small, entireties of the EA members are collapsed in the vehicle-width direction without collapsing in the up-down direction. If the entireties of the EA members are displaced in the up-down direction, the energy absorption effect by the EA members as a whole is impaired. The vehicle body lower structure 3 according to the embodiment is configured to suppress the displacement of the entireties of the EA members upon the lateral collision.

The first protrusion 24 of the first EA member 20 is under the second protrusion 34 of the second EA member 30. This relationship enables the first EA member 20 to be fixed to the rocker 10 (vehicle body) together with the power supply package 40 after the second EA member 30 has been fixed to the rocker 10, as is shown well in FIG. 3.

Figure 4:
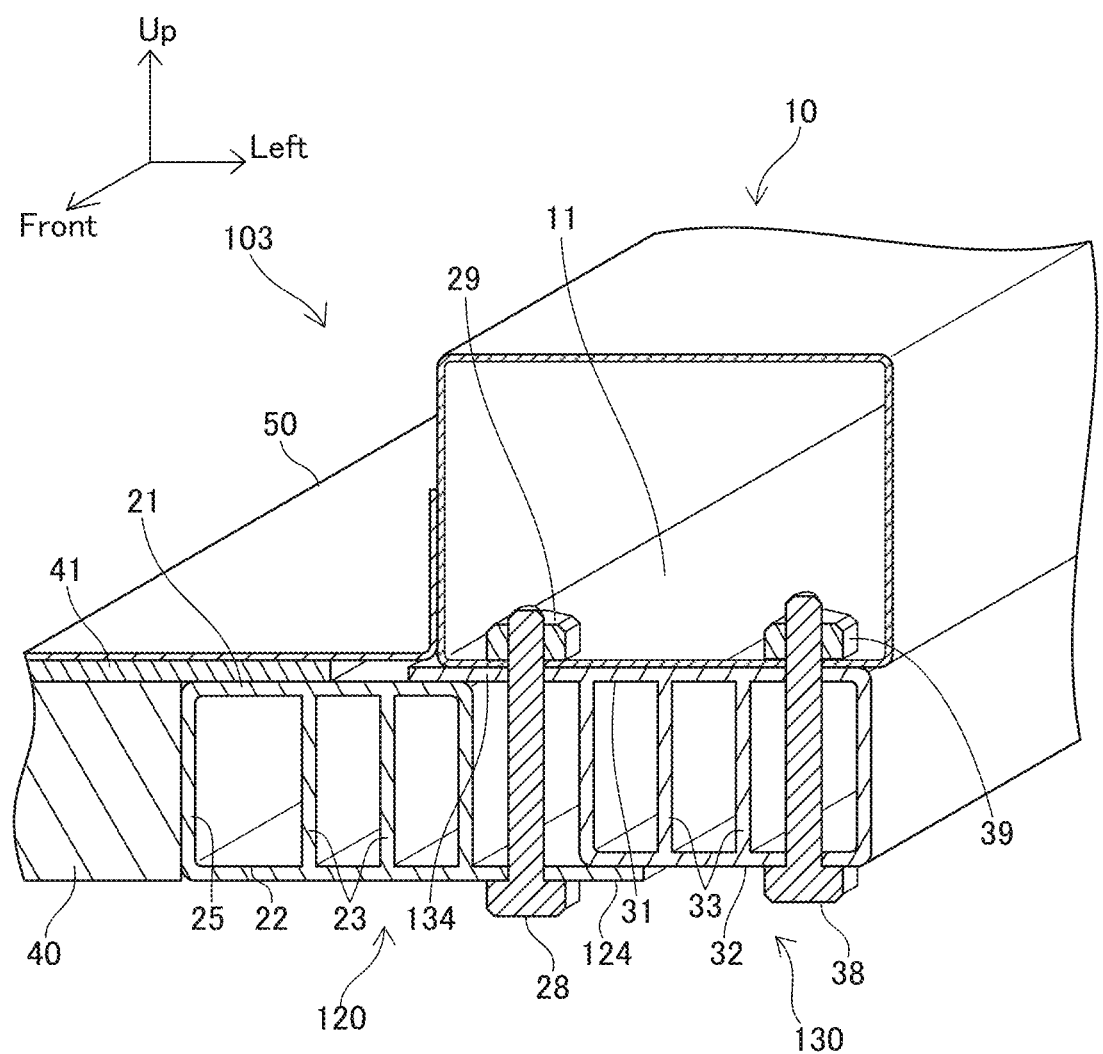
FIG. 4 is a cross-sectional view of a vehicle body lower structure according to a variant.
Figure 5:
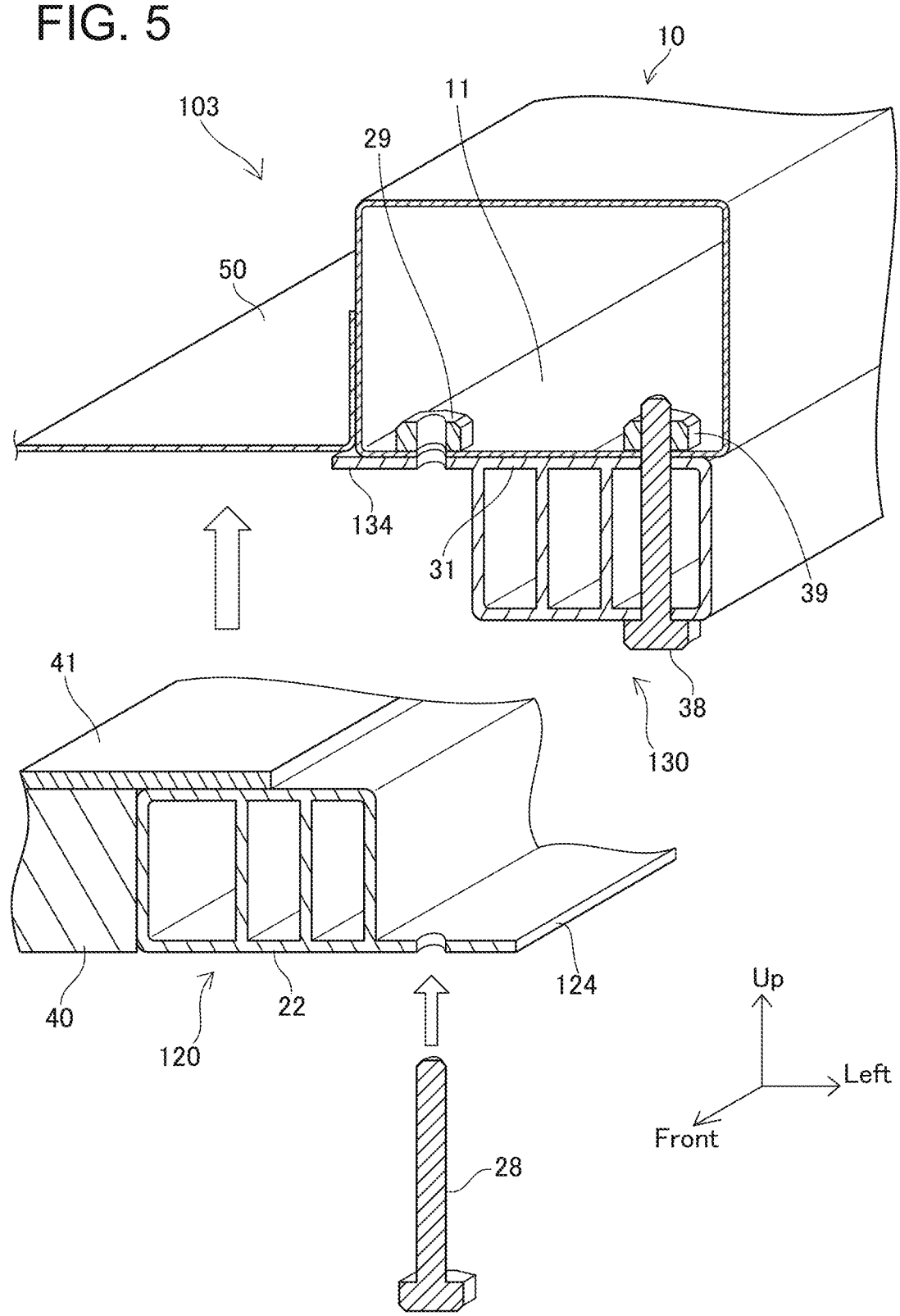
FIG. 5 illustrates a power supply package and a first energy absorbing member being separated from a second energy absorbing member and a rocker (variant).

(Variant) FIG. 4 shows a cross-sectional view of a vehicle body lower structure 103 according to a variant. FIG. 5 shows the vehicle body lower structure 103 in which a power supply package 40 and a first EA member 120 are separated from a rocker 10 and a second EA member 130.

In the vehicle body lower structure 103 of the variant, a shape of a first protrusion 124 of the first EA member 120 is different from that of the aforementioned first protrusion 24, and a shape of a second protrusion 134 of the second EA member 130 is different from that of the aforementioned second protrusion 34. The first protrusion 124 is a part of a lower plate 22 of the first EA member 120 elongated outward in the vehicle-width direction. The second protrusion 134 is a part of an upper plate 31 of the second EA member 130 elongated inward in the vehicle-width direction. That is, the first protrusion 124 and the second protrusion 134 are both plate-like.

The first protrusion 124 and the second protrusion 134 overlap as seen along the up-down direction and are fastened together to the rocker 10 by a bolt 28. The first protrusion 124 is located below the second protrusion 134. The second EA member 130 is further fastened to the rocker 10 by another bolt 38 (an additional bolt) located on the outer side in the vehicle-width direction relative to the bolt 28.

Since the first protrusion 124 is plate-like, the rigidity of the first protrusion 124 in the up-down direction is smaller than that of the first protrusion 24 in the vehicle body lower structure 3. However, since the plate-like first protrusion 124 overlaps a lower plate 32 of the second EA member 130, a structure supported with two ends can be obtained for the first protrusion 124. Due to this structure, the first protrusion 124 endures a fastening force of the bolt 28 well. The same applies to the plate-like second protrusion 134, and since it overlaps the upper plate 21 of the first EA member 120, a structure supported with two ends can be obtained for the second protrusion 134. Due to this, the second protrusion 134 also endures the fastening force of the bolt 28 well. The vehicle body lower structure 103 of the variant can give the same advantage as the vehicle body lower structure 3 of the embodiment.

Points to be noted with regard to the art described in the embodiment will be described. The power supply package 40 of the vehicle body lower structure 3 of the embodiment houses batteries therein. The power supply package 40 may be a device which houses fuel cells therein.

The vehicle body lower structure 3 comprises the pair of rockers 10, the first EA members 20, and the second EA members 30. The pair of rockers 10 is arranged at the lower side of the vehicle body on both sides in the vehicle-width direction. The first EA member 20 and the second EA member 30 are arranged for each of the rockers 10. Thus, technically speaking, the vehicle body lower structure 3 comprises the pair of rockers 10, a pair of the first FA members 20, and a pair of the second EA members 30. For each of the rockers 10, a corresponding one of the first EA members 20 in the pair and a corresponding one of the second EA members 30 in the pair are arranged. The lower structure of the vehicle body on the right side is the same as the lower structure of the vehicle body on the left side (FIGS. 2, 3). The same applies to the vehicle body lower structure 103.

Having two energy absorbing members between a power supply package and a rocker, that is, dividing an energy absorbing member between the power supply package and the rocker into two may give the following advantages. That is, by dividing the energy absorbing member into two may reduce a size of an assembly of the power supply package and the energy absorbing member (first energy absorbing member fixed to the power supply package). Downsizing of the assembly of the power supply package and the energy absorbing member may contribute to reducing in weight of the assembly, and further contribute to improving productivity of the assemblies.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body lower structure comprising:
   a rocker arranged at a lower lateral part of a vehicle body and extending along a front-rear direction of the vehicle body;
   a power supply package arranged under a floor panel of the vehicle body;
   a first energy absorbing member fixed to a lateral side of the power supply package; and
   a second energy absorbing member being adjacent to the first energy absorbing member in a vehicle-width direction of the vehicle body, the second energy absorbing member being located outside the first energy absorbing member in the vehicle-width direction of the vehicle body and being located under the rocker;
   wherein
   the first energy absorbing member includes a first protrusion protruding outward in the vehicle-width direction,
   the second energy absorbing member includes a second protrusion protruding inward in the vehicle-width direction,
   the first protrusion and the second protrusion overlap each other in an up-down direction and are attached together to the rocker by a bolt; and
   each of the first energy absorbing member and the second energy absorbing member is detachable from the rocker.

2. The vehicle body lower structure of claim 1, wherein the first protrusion is arranged under the second protrusion.

3. The vehicle body lower structure of claim 1, wherein the second energy absorbing member is attached to the rocker by an additional bolt located outside the bolt in the vehicle-width direction.

4. The vehicle body lower structure of claim 1, wherein the first and second energy absorbing members are hollow beams extending along the front-rear direction of the vehicle body.

5. The vehicle body lower structure of claim 4, wherein
   the first protrusion protrudes from a lower plate of the first energy absorbing member, and
   the second protrusion protrudes from an upper plate of the second energy absorbing member.

* * * * *